United States Patent
Wang et al.

(10) Patent No.: US 9,960,865 B2
(45) Date of Patent: May 1, 2018

(54) FILTERING OF WI-FI PHYSICAL LAYER MEASUREMENTS

(71) Applicant: Apple Inc., Cupertino, CA (US)

(72) Inventors: Xiaowen Wang, Cupertino, CA (US); Vinay R. Majjigi, Sunnyvale, CA (US); Syed A. Mujtaba, Santa Clara, CA (US); Christopher J. Hansen, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 14/152,739

(22) Filed: Jan. 10, 2014

(65) Prior Publication Data

US 2014/0192669 A1    Jul. 10, 2014

Related U.S. Application Data (60) Provisional application No. 61/751,225, filed on Jan. 10, 2013.

(51) Int. Cl.
| | | |
|---|---|---|
| *H04B 17/318* | (2015.01) | |
| *H04W 48/16* | (2009.01) | |
| *H04B 17/26* | (2015.01) | |

(52) U.S. Cl.
CPC ........... *H04B 17/318* (2015.01); *H04B 17/26* (2015.01); *H04W 48/16* (2013.01)

(58) Field of Classification Search
CPC ....... H04W 84/12; H04W 4/206; H04W 4/02; H04W 8/20; H04W 24/00; H04W 24/10; H04W 48/16; H04W 12/12; H04L 67/18; H04L 67/04; H04L 67/20; H04L 29/06; H04L 63/1408; H04L 63/16; H04B 17/318; H04B 17/26

USPC ........ 370/252; 455/522, 456.1, 456.3, 456.5, 455/456.6
See application file for complete search history.

(56) References Cited

U.S. PATENT DOCUMENTS

| | | | |
|---|---|---|---|
| 8,089,371 B2 * | 1/2012 | Pandey ................ | G06K 7/0008 340/10.2 |
| 8,432,866 B1 * | 4/2013 | Tapaninen ................ | H04L 1/20 370/252 |
| 2002/0143928 A1 * | 10/2002 | Maltz ..................... | H04L 29/06 709/224 |

(Continued)

*Primary Examiner* — Andrew Chriss
*Assistant Examiner* — Rasha Fayed
(74) *Attorney, Agent, or Firm* — Downey Brand LLP (57) ABSTRACT

A station (STA) can receive messages (e.g., beacon frames) at a regular interval, and perform measurements on the received messages. The STA maintains a running average of recent measurement values, and updates the running average after each new measurement interval. At some measurement opportunities, the expected messages cannot be received by the STA, and so the STA cannot perform a measurement; when this occurs, the STA can choose substitute values to use for the missed measurements when next calculating the running average. As one example, the STA can substitute the value for a previously-performed measurement for the missed measurements. As another example, the STA can substitute a predetermined low value for the missed measurements. Based on the value of the running average at a given point in time, the STA can take actions such as initiating a roaming scan or switching to a different wireless interface.

19 Claims, 6 Drawing Sheets

(56) References Cited

U.S. PATENT DOCUMENTS

| | | | |
|---|---|---|---|
| 2003/0181211 A1* | 9/2003 | Razavilar | H04W 16/10 455/450 |
| 2005/0059367 A1* | 3/2005 | Kim | H04B 17/21 455/138 |
| 2006/0009161 A1* | 1/2006 | Beecher | H04W 28/18 455/67.11 |
| 2007/0259624 A1* | 11/2007 | Alizadeh-Shabdiz | G01S 11/02 455/67.11 |
| 2008/0186933 A1* | 8/2008 | Willman | H04W 88/02 370/338 |
| 2008/0232291 A1* | 9/2008 | Hus | H04L 1/0015 370/312 |
| 2009/0143024 A1* | 6/2009 | Tocze | H04B 17/26 455/77 |
| 2009/0286548 A1* | 11/2009 | Coronel | H04W 4/20 455/456.1 |
| 2012/0276863 A1* | 11/2012 | Li | H03G 3/3078 455/226.1 |
| 2012/0294173 A1 | 11/2012 | Su et al. | |
| 2013/0122935 A1* | 5/2013 | Das | H04W 4/028 455/456.3 |
| 2013/0237233 A1* | 9/2013 | Radulescu | H04W 36/22 455/440 |
| 2013/0308475 A1* | 11/2013 | Celebi | H04W 72/1231 370/252 |
| 2014/0016490 A1 | 1/2014 | Tabet et al. | |
| 2014/0022918 A1* | 1/2014 | Guo | H04W 48/20 370/252 |
| 2014/0140223 A1* | 5/2014 | Yang | H04W 36/0088 370/252 |

* cited by examiner

FILTERING OF WI-FI PHYSICAL LAYER MEASUREMENTS

CROSS-REFERENCE TO RELATED APPLICATIONS

This application claims the benefit of U.S. Provisional Application No. 61/751,225, filed Jan. 10, 2013 and entitled "FILTERING OF WIFI PHYSICAL LAYER MEASUREMENTS," which is incorporated by reference herein in its entirety for all purposes.

FIELD

The described embodiments relate generally to wireless networking technology. More particularly, the present embodiments relate to filtering physical layer measurements for a wireless device.

BACKGROUND

A wireless station (STA) operating in a wireless network can measure characteristics of received packets, using metrics such as Received Signal Strength Indicator (RSSI), Signal to Noise ratio (SNR), and/or noise floor. Current approaches exist that include taking averages of a metric over time, (e.g., maintaining a running average of multiple RSSI measurements over a given time duration); however, these current approaches possess a number of limitations. Given the importance of measurements in wireless systems, improvements to these current approaches would be advantageous.

SUMMARY

This paper describes various embodiments that relate generally to wireless networking technology. More particularly, the present embodiments relate to filtering physical layer measurements for a wireless device.

A wireless station (STA) can receive messages (e.g., beacon frames) at a regular interval, and perform measurements on the received messages. The STA applies a filter to a set of recent measurement values, and updates a value for the filter after each new measurement interval. The filter can involve, for example, determining a running average of a set of N most recent measurement values, wherein N is a non-negative integer and the "value" for the filter includes the running average. At some measurement opportunities, the expected messages cannot be received by the STA, and so the STA cannot perform a measurement; when this occurs, the STA can choose substitute values to use in place of the missed measurements when next calculating the value for the filter. As one example, the STA can substitute the value for a previously performed measurement for the missed measurements. As another example, the STA can substitute a predetermined value for the missed measurements. In some embodiments, the predetermined value is a "low" value that corresponds to a low signal quality, a low signal strength, or another representative low signal metric, e.g., as can occur when a packet is not able to be properly received and/or decoded. Based on the value of the filter at a given point in time, the STA can take actions such as initiating a roaming scan or switching to a different wireless interface.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments can be used, and changes can be made without departing from the spirit and scope of the described embodiments.

The following is a glossary of terms used in this document:

Wi-Fi: This term Wi-Fi refers to an Institute of Electrical and Electronics Engineers (IEEE) 802.11× technology, including but not limited to 802.11a, 802.11b, 802.11g, 802.11n, and/or 802.11ac technology.

Non-transitory computer-readable medium: A device for data storage, such as a hard disk, an optical medium (such as a CD-ROM, a DVD, or a Blu-ray disc), a magneto-optical medium, a memory device (such as a Dynamic Random Access Memory (D-RAM), Static RAM (S-RAM), or other type of Random Access Memory (RAM)), a register, a cache memory, a Read Only Memory (ROM), a flash memory (based on, e.g., EEPROM flash memory technology or NAND flash memory technology), or other type of non-transitory device for electronic data storage. A non-transitory computer-readable medium is distinguishable from a transitory computer-readable medium, such as a transitory signal.

Memory module: A memory module is a device for volatile or non-volatile data storage. A memory module can be or can include one or more devices such as a RAM (such as a D-RAM or S-RAM), a hard disk, a flash memory, a magneto-optical medium, an optical medium, or other type of device for volatile or non-volatile data storage.

Processor: A processor can be or include, for example, a single- or multi-core processor, a conventional processor, a special purpose processor, a digital signal processor (DSP), a plurality of microprocessors, one or more microprocessors in association with a DSP core, a controller or microcontroller, one or more Application Specific Integrated Circuits (ASICs), one or more Field Programmable Gate Array (FPGA) circuits, or a system-on-a-chip (SOC).

Wireless Module: A wireless module can be an integrated circuit or other type of circuit, or other type of device for implementing wireless communications and related functionality. A wireless module can include one or more of: a memory module; a processor and/or specific-purpose DSP circuitry; and analog circuitry for communicating wireless data (e.g., one or more amplifiers, mixers, and/or oscillators).

These and other embodiments are discussed below with reference to FIGS. 1 to 5; however, those skilled in the art will readily appreciate that the detailed description given herein with respect to these figures is for explanatory purposes only and should not be construed as limiting.

Figure 1:
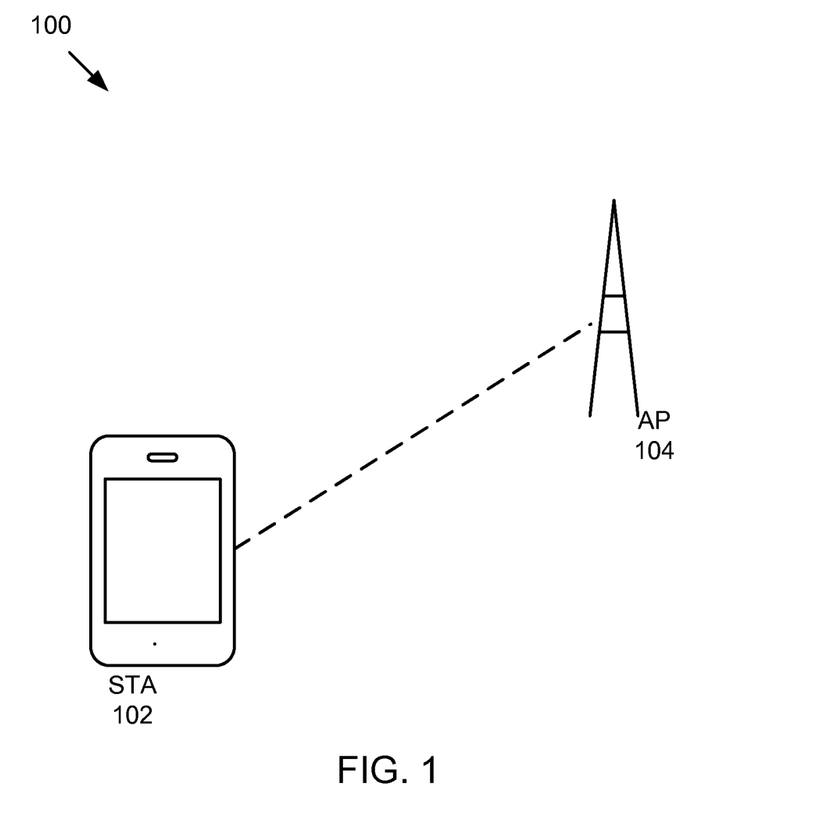
FIG. 1 illustrates a representative network architecture in accordance with some embodiments.

FIG. 1 illustrates a diagram 100 of a representative architecture where the features described herein can be implemented in accordance with some embodiments. The example architecture includes a wireless station (STA) 102 and a wireless access point (AP) 104. The STA 102 and/or the AP 104 can be referred to as a wireless device in some embodiments. The STA 102 and the AP 104 can communicate using Wi-Fi technology, via a wireless local area network provided by the AP 104. In some implementations, the AP 104 can also implement router functionality, and/or be connected to the Internet via one or more intermediate networks; in such an instance, the STA 102 can be able to transmit/receive data to/from the Internet via the AP 104.

The STA 102 can be, for example, a laptop computer, tablet computer, cellular phone, a smartphone, a user equipment (UE), a mobile device, a handset, or other type of electronic device. The STA 102 can include a processor for, among other functions, executing the operating of the STA 102 (an application processor), and a wireless module for communicating using Wi-Fi (a Wi-Fi module). The STA 102 can also include one or more other wireless modules, for communicating via e.g. Bluetooth, GSM/EDGE, UMTS, CDMA2000, LTE, and/or LTE-A technology.

As will be described in further detail below, the Wi-Fi module in the STA 102 can take periodic measurements with respect to data received from the AP 104. The Wi-Fi module can filter the measurement data (for example, the Wi-Fi module can maintain a running average of the measurements, i.e., take a measurement every X ms, and average a set of "most recent" N measurements); and the Wi-Fi module can provide the current value for the filter, e.g., the current running average value of measurements, to the application processor in the STA 102. The Wi-Fi module can provide the value for the filter periodically, e.g., in response to polling by the application processor, and/or via some other mechanism. Based on one or more values for the filter provided, the application processor can determine that the STA 102 should perform one or more actions, such as performing a roaming scan, transitioning the STA 102 to a different AP 104, or switching to a different wireless module (e.g. from a Wi-Fi wireless module to a cellular wireless module in the STA).

Figure 2:
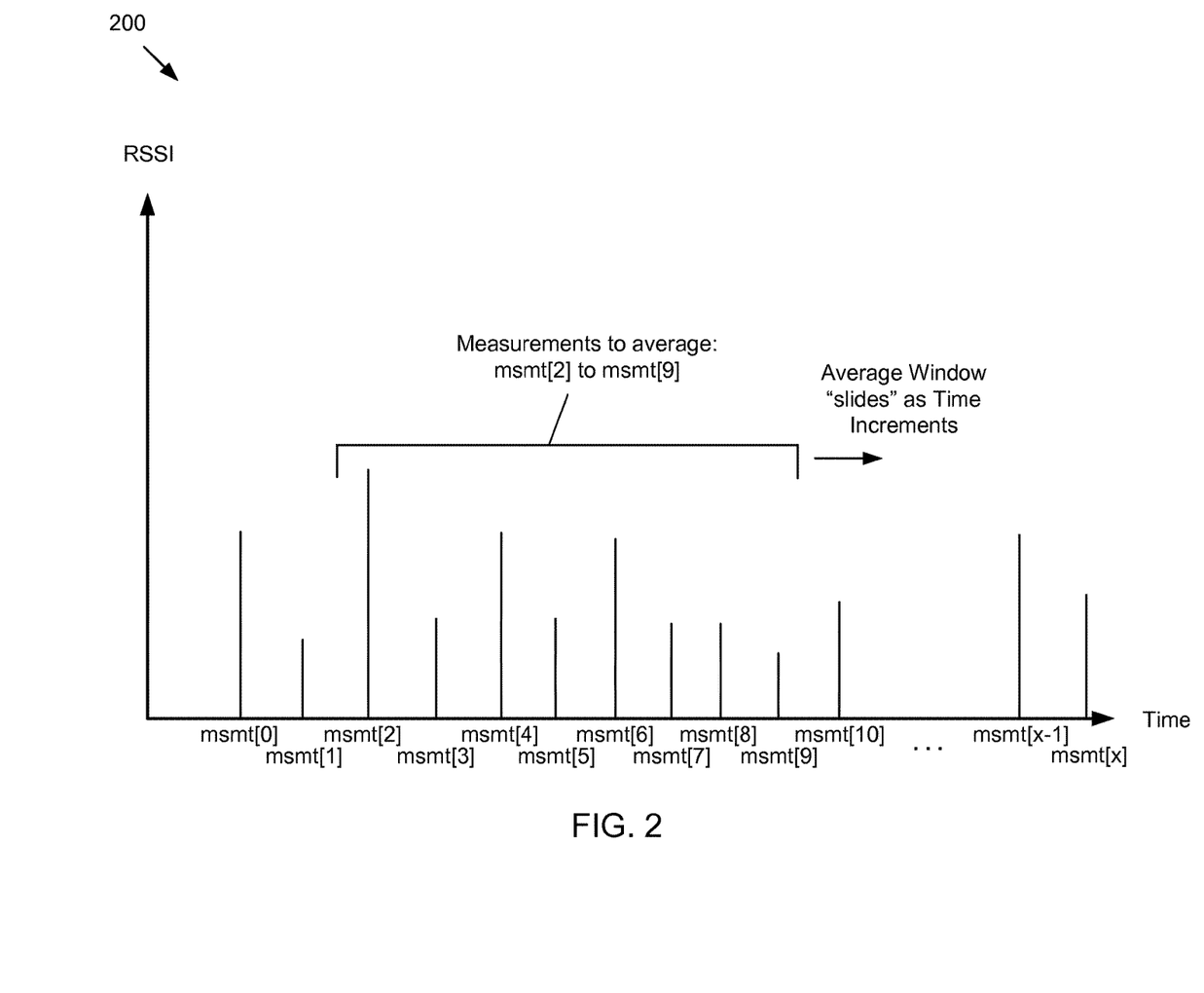
FIG. 2 illustrates an approach for determining an average of measurements collected for a set of measurement time intervals in accordance with some embodiments.

FIG. 2 illustrates a diagram 200 of an approach for determining an average of measurements collected for a set of measurement time intervals in accordance with some embodiments. A Wi-Fi module in the STA 102 can receive beacon frames from the AP 104 at a regular interval (e.g., every 100 ms), and can measure a signal metric, e.g., the RSSI, of each received beacon frame. The Wi-Fi module can define a time window ("average window") for keeping a running average of the RSSI measurements, and can update the running average after each beacon frame is received. For example, in an instance where the beacon frame time interval is 100 ms and the average window is 0.8 seconds in duration, the Wi-Fi module can maintain a value that indicates an average of the last eight measured RSSI values (i.e., the last eight values, each of which was received at 100 ms time intervals during the 0.8 second long average window), and the Wi-Fi module can update the running average of measurement values after each new 100 ms time interval.

An example of averaging of measurements is shown by the diagram 200 in FIG. 2. In FIG. 2, the vertical ordinate axis relates to measured RSSI values (or other similar physical layer signal metrics), while the horizontal abscissa axis relates to time. Along the horizontal abscissa axis, several different measurements (msmt[0], msmt[1], etc.) are indicated that the Wi-Fi module can perform in accordance with beacon time intervals, e.g., measurements can be taken corresponding to when beacons are received from the AP 104 by the STA 102. Also as shown in FIG. 2, a window of eight measurement values (labeled "measurements to average" in FIG. 2) can be used to determine a running average. As shown in FIG. 2, measurement two through measurement nine (i.e., msmt[2] through msmt[9]) can be used to determine an average value corresponding to measurements over an average window. The average window can "slide" along the abscissa axis as time increments (e.g., to use msmt[3] through msmt[10] for a subsequent average over the average window, and then to msmt[4] through msmt[11] for a following average, and so on). In some embodiments, the average window can use more measurements or fewer measurements than shown in FIG. 2. In some embodiments, the measurement values can be "weighted" across the average window, e.g., to determine a "weighted" average value for the average window by weighting each measurement by a weighting factor.

Figure 3:
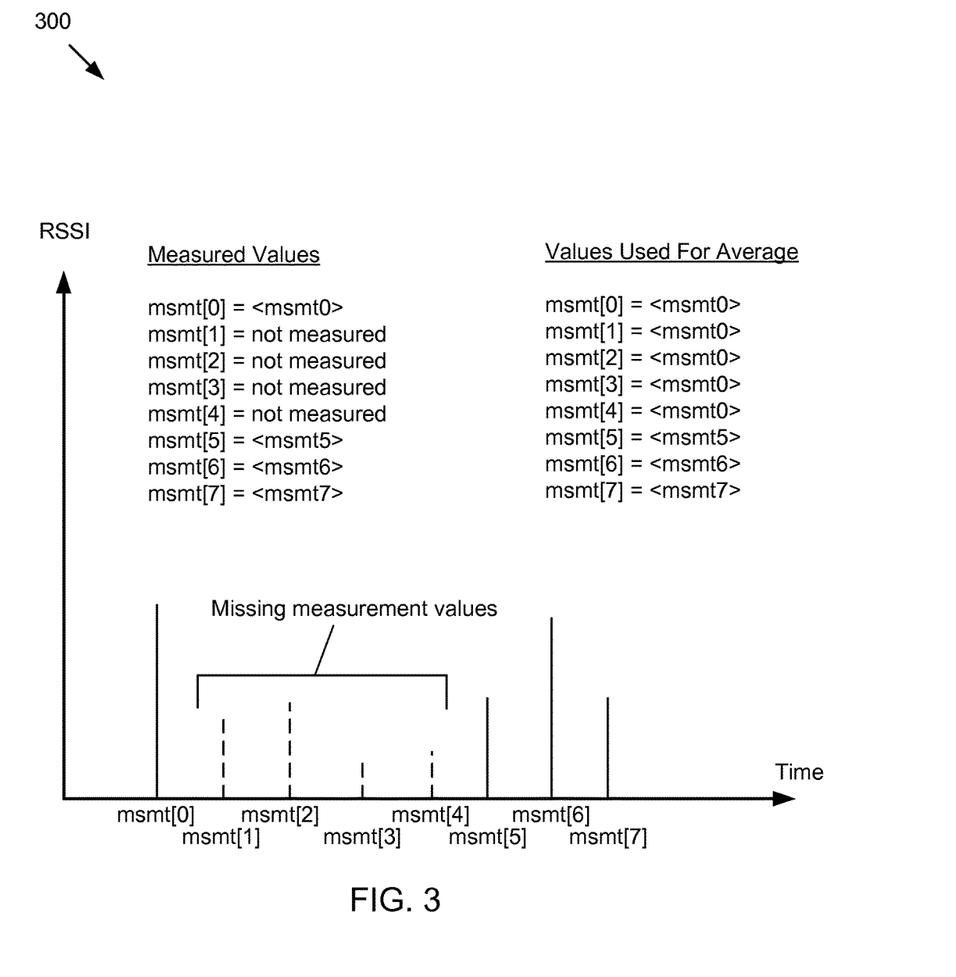
FIG. 3 illustrates an approach for determining an average of measurements, where a previously measured value is substituted for one or more measurement values (or a lack thereof) for measurement intervals in which a message was not successfully received by a wireless device in accordance with some embodiments.

FIG. 3 illustrates a diagram 300 of an approach for determining an average of measurements, where a previously measured value is substituted for one or more measurement values (or a lack thereof) for measurement intervals in which a message (or a beacon frame or another signal for which measurements are taken) was not successfully received by a wireless device in accordance with some embodiments. For various reasons, the Wi-Fi module can be unable to receive a beacon frame at a given beacon interval. (Some of these reasons include (1) the AP 104 can be unable to transmit at a given time interval because a different STA 102 is transmitting, (2) the AP 104 transmits the beacon during the time interval but the STA 102 can be unable to correctly receive the beacon, e.g., due to radio frequency interference or signal fading, (3) the STA 102 has been transported out of a coverage area for the AP 104 by a user of the STA 102, and/or (4) some other reason.) The running average of measurements, however, can require a measurement value for each time interval, e.g., in order to determine the running average of measurement values. The Wi-Fi module can handle the lack of an "actual" measurement value for a given time interval in a number of different ways.

In a first approach, when a Wi-Fi module of an STA 102 is not able to receive a beacon for a consecutive set of one or more beacon time intervals, the Wi-Fi module can use a measured value based on an earlier measurement in the average window in place of one or more missed measurements. The earlier measurement used by the Wi-Fi module can be a most recent measurement that was successfully taken before the set of missed beacon time intervals began.

An example of the first approach is illustrated in FIG. 3. In FIG. 3, the Wi-Fi module of the STA 102 can use an average window that spans 0.8 seconds, with a beacon time interval of 100 ms. As shown in FIG. 3, the Wi-Fi module can perform a successful measurement at msmt[0], but can be not able to perform measurements at msmt[1] to msmt[4]; so, for the values for the measurements at msmt[1] to msmt[4], the Wi-Fi module can insert the previously measured value from msmt[0]. At the end of the average window, when the values for msmt[0] to msmt[7] are averaged together to generate the average for the average window measurement time period, values for msmt[1] to msmt[4] can substitute the same value as for the measured value msmt[0], and the determined average for the average window can reflect this substitution.

In some embodiments, the Wi-Fi module can insert previously measured values for missing measurements for up to a maximum number of consecutive missing measurements. The Wi-Fi module can consider the previously measured values to be "stale" after the maximum number of consecutive missing measurements and can instead substitute a pre-determined value for subsequent consecutive measurement intervals (beyond the maximum number) when measurements continue to be missing. In some embodiments, the Wi-Fi module can use previously measured values up to a particular continuous length of time during which measurements are missing and afterwards substitute a predetermined value for subsequent measurement intervals. Thus, the Wi-Fi module can substitute either previously measured values for up to a particular number of consecutive measurement intervals that are missing values or for up to a particular length of time over which consecutive measurement intervals are missing measurement values. The Wi-Fi module, in some embodiments, can substitute a predetermined value, as described further herein, for measurement intervals beyond the particular number of consecutive measurement intervals or for measurement intervals that occur after the particular length of time. In some embodiments, the Wi-Fi module can substitute the predetermined value for missing measurements whenever a measurement value is missing irrespective of the number of consecutive measurement intervals that are missing values or irrespective of the length of time over which measurements are missing.

Figure 4:
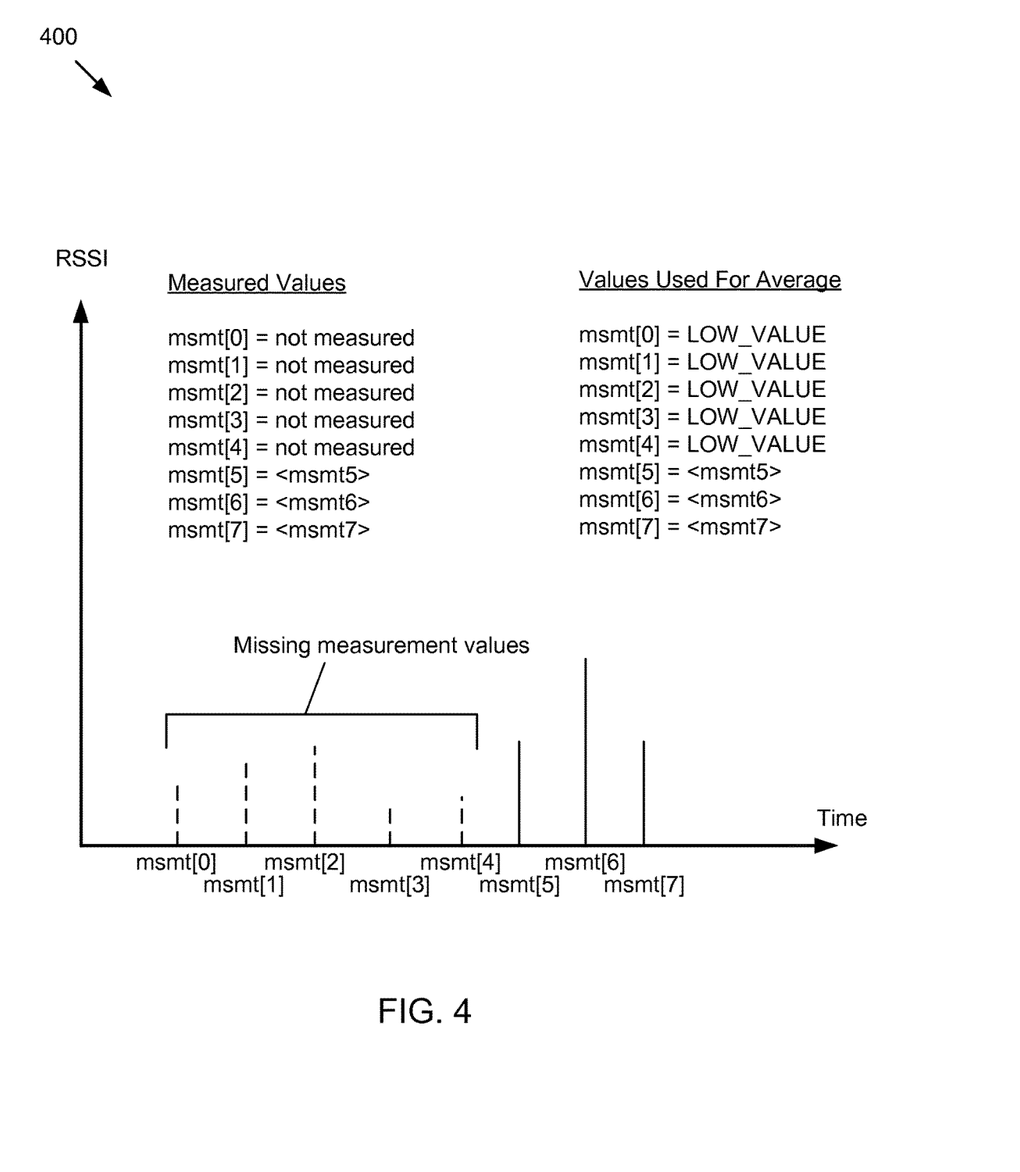
FIG. 4 illustrates another approach for determining an average of measurements, where a predetermined low value is substituted for one or more measurement values (or a lack thereof) for measurement intervals where a message was not successfully received by the wireless device in accordance with some embodiments.

FIG. 4 illustrates a diagram 400 of another approach for determining an average of measurements, where a predetermined low value is substituted for one or more measurement values (or a lack thereof) for measurement intervals where a message was not successfully received by the wireless device in accordance with some embodiments. As an alternative and/or in addition to the approach described above for FIG. 3, the Wi-Fi module of the STA 102 can perform the following to handle measurements on beacon intervals where the beacon is not received. The Wi-Fi module can determine that a given number of consecutive beacons were not received (or a single beacon), and can set values for the missed measurement(s) to a predetermined low value ("LOW_VALUE"). The missed beacon(s) can be at the beginning of an average window, in the middle of an average window, or at the end of an average window. In some embodiments, the value used for LOW_VALUE can be set to reflect an RSSI value that can typically be seen as low, unacceptable, and/or that would cause packet loss in the wireless network. In some embodiments, the LOW_VALUE can be a value associated with a signal quality or a signal strength that can be considered "below" an acceptable threshold for correct signal detection, reception, and/or decoding of wireless packets. Alternatively or additionally, the value used for the LOW_VALUE can be set such that, when the application processor receives a running average having a value of LOW_VALUE, the application processor can make a determination that a corrective action (e.g., to perform a roaming scan or to switch between different wireless interfaces of the wireless device/STA) should be taken. As a representative example, values that can be used for this LOW_VALUE include but are not limited to: −80 dBm; −81 dBm; −82 dBm; −83 dBm; −84 dBm; −85 dBm; −86 dBm; −87 dBm; −88 dBm; −89 dBm; and −90 dBm. In some embodiments, the value for the LOW_VALUE can be selected in accordance with the wireless communication protocol in use, e.g., different LOW_VALUES can be used for different versions of Wi-Fi as appropriate.

The Wi-Fi module can also determine that beacons were not received during a continuous time interval equal to or exceeding a particular length of time. Whenever beacons are not received by the STA 102 for at least the particular length of time, a pre-determined low value, e.g., "LOW_VALUE", can be substituted as a measurement value for the missing measurements. For example, the particular length of time can be a time interval that spans N milliseconds, and when no beacons are received by the STA 102 for N or more consecutive milliseconds, the STA 102 can substitute the pre-determined low value. In some embodiments, the STA 102 can substitute the pre-determined low value using a criteria based on a number of consecutive missed beacons (or similarly consecutive missed measurements for consecutive measurement intervals). In some embodiments, the STA 102 can substitute the pre-determined low value using a criteria based on consecutive time interval of missed beacons (or missing measurements). The STA 102 can use either criteria individually to determine when to substitute the pre-determined low value; however, both criteria would not be used at the same time. In some embodiments, the "time interval" based criteria can be used when the STA 102 wakes to listen for only some beacons but not for every beacon, e.g., thus a time interval criteria can be met even when a number of consecutive beacons can be not met.

As illustrated in FIG. 4, the Wi-Fi module of the STA 102 can use an average window of 0.8 seconds, with a beacon interval of 100 ms. The Wi-Fi module can be configured to determine that, when five consecutive beacons are missed, the values for those measurements should be set to the LOW_VALUE. As show in FIG. 4, the Wi-Fi module is unable to perform measurements at msmt[0] to msmt[4]. The Wi-Fi module can determine that, because these five measurements have been missed, the values for those measurements should be set to LOW_VALUE, and can substitute the LOW_VALUE for the measurement values that are missed accordingly. At the end of the average window, when the values for msmt[0] to msmt[7] are averaged to generate the average for the average window time period, msmt[0] to msmt[4] can include values of LOW_VALUE, and the determined average for the average window can reflect this substitution.

As mentioned above, a predetermined low value can be used as a substitute value for measurements that can be missed, e.g., when beacons can be unable to be received by the STA 102. However, in an instance when, for a particular signal metric used for the measurements, a "low" value is actually better than a "high" value (e.g., as can be relevant for a noise floor where a low value is better than a high value), then the above-described features can be used, mutatis mutandis, with a corresponding HIGH_VALUE used when measurements are missed instead of a LOW_VALUE.

Figure 5:
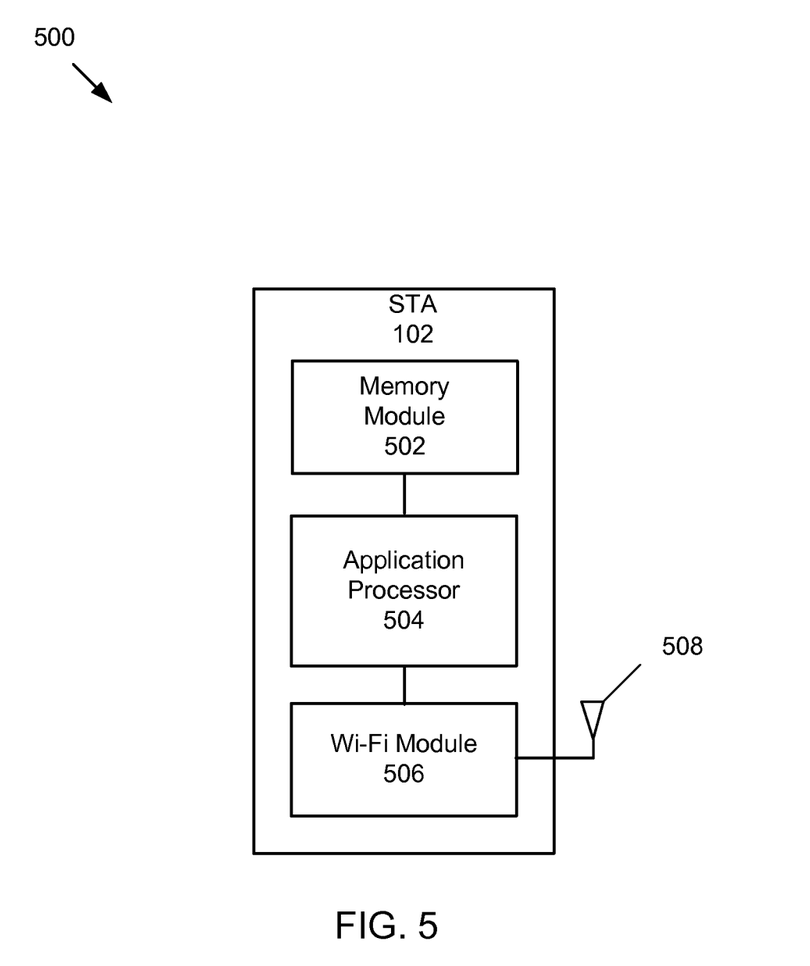
FIG. 5 illustrates a set of components that can be included in an STA in accordance with some embodiments.

FIG. 5 illustrates a diagram 500 of a set of components that can be included in an STA 102 in accordance with some embodiments. As shown in FIG. 5, the STA 102 can include an application processor 504, a Wi-Fi module 506, and a memory module 502, which can be connected via one or more wired connections (e.g., based on a universal asynchronous receiver/transmitter (UART) or a universal serial bus (USB)). The Wi-Fi module 506 of the STA 102 can also be connected to an antenna 508 (or a set of antennas), as illustrated in FIG. 5. In some embodiments, the STA 102 can include multiple wireless modules (not shown) that can include the Wi-Fi module 506 as one of the multiple wireless modules, and each wireless module can operate in accordance with one or more different wireless communication protocols. In some embodiments, the Wi-Fi module 506 can receive signals, obtain measurement values for measurement intervals based on the received signals, substitute values for measurement intervals in which signals are not successfully received, obtain average measurement values over an averaging time window, and provide the average measurement values to the application processor 504. In some embodiments, the application processor 504 can cause the STA 102 to undertake corrective actions based on the average measurement values, e.g., when one or more of the average measurement values satisfy a performance criterion. In some embodiments, the application processor 504 and/or the Wi-Fi module 506 (or similar wireless modules) can be referred to as processing circuitry.

In some instances, the STA 102 can be connected to a display device (such a liquid crystal display (LCD), a light emitting diode (LED), or an organic light emitting diode (OLED) monitor) or can include a display device (such a touchscreen based on LCD or LED/OLED technology), and/or can be connected to and/or include an input device, such as a keyboard, mouse, touchpad, or touchscreen.

The memory module 502 in the STA 102 can store instructions which, when executed by the processor in the STA 102, cause the processor to perform (in conjunction, as appropriate, with the Wi-Fi module and/or the display device) the features described herein as performed by the application processor in the STA 102.

The Wi-Fi module 506 can also include its own memory module (not shown in FIG. 5) which can store instructions, when executed by a processor (and/or other DSP circuitry) in the Wi-Fi module 506 cause the Wi-Fi module 506 to perform the features described herein as performed by the Wi-Fi module 506.

While the approaches of FIG. 3 and FIG. 4 are described as distinct approaches, this was done for ease of description; while the STA 102 can employ each approach individually, the STA 102 can also concurrently employ multiple approaches. In some embodiments, the STA 102 can use a previously measurement value for measurement intervals for which measurement values are missing when the "missing" measurement interval falls within a particular number of measurement intervals from a previous measurement interval for which a measurement was determined. For example, any measurement interval within five (or another positive integer number) measurement intervals of a previous measurement interval can substitute a previous measurement value when the current measurement interval is missing a value. Other measurement intervals for which a measurement does not occur can substitute a pre-determined value, e.g., the LOW_VALUE, when the measurement interval that is missing a value is more than the particular number of measurement intervals separated from a previous measurement interval for which a measurement was determined. For example, in an instance where an average window includes eight measurement intervals, a STA 102 can substitute values as follows:

```
msmt[0] = <msmt[0]>      --->    msmt[0] = <msmt[0]>
msmt[1] not measured     --->    msmt[1] = <msmt[0]>
msmt[2] not measured     --->    msmt[2] = <msmt[0]>
msmt[3] not measured     --->    msmt[3] = <msmt[0]>
msmt[4] not measured     --->    msmt[4] = <msmt[0]>
msmt[5] not measured     --->    msmt[7] = LOW_VALUE
msmt[6] not measured     --->    msmt[7] = LOW_VALUE
msmt[7] not measured     --->    msmt[7] = LOW_VALUE
```

The example listed above substitutes the previous measurement value of <msmt[0]> for five subsequent measurement intervals for which no measurement is determined (i.e., the measurement did not occur due to interference, low signal quality, or other reasons as described herein.) The example listed above also substitutes a predetermined value, namely the LOW_VALUE, for measurement intervals for which no measurement is determined that are more than five measurement intervals away from the previous measurement interval in which a measurement was determined. By limiting the number of measurement intervals over which a previous measurement can be substituted, a "stale" measurement can be avoided, e.g., during a long time period over which actual measurements are not available. The predetermined value can be chosen to correspond to a low signal quality, low signal strength, "out of synchronization" signal level, or other physical layer measurement level that corresponds to packet loss. The transition from substituting a previous measurement value to substituting a predetermined measurement value for measurement intervals in which no measurement is obtained can be based on a particular number of measurement intervals, which can be fixed, variable, or adaptive. The transition can also occur based on an amount of elapsed time (in place of or in addition to a number of intervening measurement intervals.)

Similar to the example listed above, in which substitutions are made for consecutive missing time intervals, the STA 102 can substitute a previous measurement value for measurement intervals that are missing values which add up to a particular continuous length of time, i.e., using a time period criteria, e.g., up to N milliseconds, and afterwards substitute a pre-determined low value for subsequent missing measurement intervals, e.g., that occur beyond the N milliseconds. Thus, the previous measurement value is substituted for consecutive measurement intervals missing values that occur within N milliseconds of the previous measurement value, and the pre-determined measurement value is substituted for additional consecutive measurement intervals missing values that occur beyond N milliseconds of the previous measurement value.

In a further embodiment, the STA 102 can substitute a pre-determined low value for missing measurements whenever a threshold number of beacons, e.g., a threshold value T, are not received and/or measureable within a continuous window that spans W measurement intervals (e.g., during each measurement interval a beacon can be expected to be received an measureable). The criteria can also be specified using a percentage threshold; e.g., whenever the percentage of measurement intervals that are missing a measurement value within a continuous window exceeds a percentage threshold value, the pre-determined value can be substituted for the measurement intervals that are missing values. As an example, a continuous window can include W=10 consecutive measurement intervals, and when at least T=7 measurement intervals within the continuous window are missing values (i.e., 70% or more of the measurement intervals in the continuous window are missing a value), the STA 102 can substitute the pre-determined low value for the missing measurement intervals. Note that W=T=5 can correspond to the previously described embodiment illustrated in FIG. 4, in which the pre-determined low value, "LOW_VALUE", is substituted when five consecutive measurement intervals (T=5) within a continuous window of W=5 consecutive measurement intervals are missing values.

(Although the above example includes LOW_VALUE, it should be understood that, as described above with reference to FIG. 4, that, depending upon the metric involved, a corresponding HIGH_VALUE can also be used.)

Although examples are described above that relate to using a moving average filter over a sliding time window, the above-described features can be used with any appropriate type of filter that can combine multiple measurement values. As one example, an infinite impulse response (IIR) filter, which combines a current measurement value with a previous filtered (average) measurement value, defined as the following can be used:

$$\text{average\_msmt}[n+1]=(1-\text{alpha})*\text{average\_msmt}[n]+\text{alpha}*\text{msmt}[n]$$

Thus, each successive "average" measurement output by the filter can be based on a most recent measurement value weighted by a weighting factor alpha and the previous determined average measurement value weighted by a weighting factor of (1−alpha). Typically, the weighting factor alpha can be a number between zero and one. A most recent measurement value can be more heavily weighted than earlier measurement values by using weighting factors closer to one. Alternatively or additionally, any other appropriate type of IIR filter (as well as any other appropriate type of finite impulse response (FIR) filter) can be used to determine "average" measurement values over a finite time window or "semi-infinite" time window. For example, multiple previous measurement values can be individually weighted and combined to form a current "average" measurement value for the filter output.

As described above, the application processor 504 and the Wi-Fi module 506 in the STA 102 can perform specific functions. However, many variations on the respective division of responsibilities between the application processor and the Wi-Fi module 506 can be possible. For example, as described above, the Wi-Fi module 506 determines a running average; in a variation on what is described above, the Wi-Fi module 506 can provide raw RSSI values to the application processor, and the application processor could perform the functionality described herein with respect to determining the running average of the RSSI values. Similarly the Wi-Fi module 506 can provide "raw" physical layer measurement values for any of a number of physical layer measurements performed during a measurement interval (or set of measurement intervals) to the application processor, which can in turn determine an "average" measurement value based on the provided physical layer measurement values.

In the foregoing description, examples of a duration for the average window (e.g., 0.8 second) and of a beacon interval (e.g., 100 ms) are provided; these examples are provided for ease of description, and the features described herein can be used with any average window duration and/or with any beacon interval. Each beacon interval can correspond to a measurement interval over which a value can be determined based on a received beacon (or other received signals). In some embodiments, a physical layer measurement value is determined during each measurement interval corresponding to a beacon interval. In some embodiments, when a measurement cannot be obtained, a substitute measurement value can be determined as described herein for a beacon interval in which a beacon (or other similar signal) is not received or not measureable. As just one example, a beacon interval of 102.4 ms can be used, and a window average duration of eight beacon intervals, which can correspond to 819.2 ms can be used. As another example, a beacon interval of 50 ms can be used, and a corresponding window average duration of 10 beacon intervals that spans 500 ms can be used.

While examples are provided above where measurements are performed using beacon frames, the above principles can be applied to any type of message/packet that can be (periodically or non-periodically) received by the STA 102. In some embodiments, a physical layer signal quality and/or signal strength metric can be used based on one or more received messages, packets, or signals.

While examples are provided above that relate to RSSI, RSSI is only one example of a measurement metric with which the features described herein can be used. For example, the features described herein can be used to perform measurements using each or any of the following metrics: SNR; noise floor; thermal noise density (Eb/No); energy per symbol over noise density (Es/No); and/or any other appropriate metric.

While the foregoing description includes examples that involve including a single STA 102 and a single AP 104, the features described herein can be used, mutatis mutandis, in a networking environment that includes any number of devices. Alternatively or additionally, although examples are provided herein that include an STA 102 and an AP 104, the features described herein can also be used, mutatis mutandis, for communications/measurements between an STA 102 and another "non-AP" STA 102—for example, with two STAs 102 operating in an ad-hoc mode. Alternatively or additionally, the features described herein as performed by the STA 102 can also be performed by an AP 104.

Figure 6:
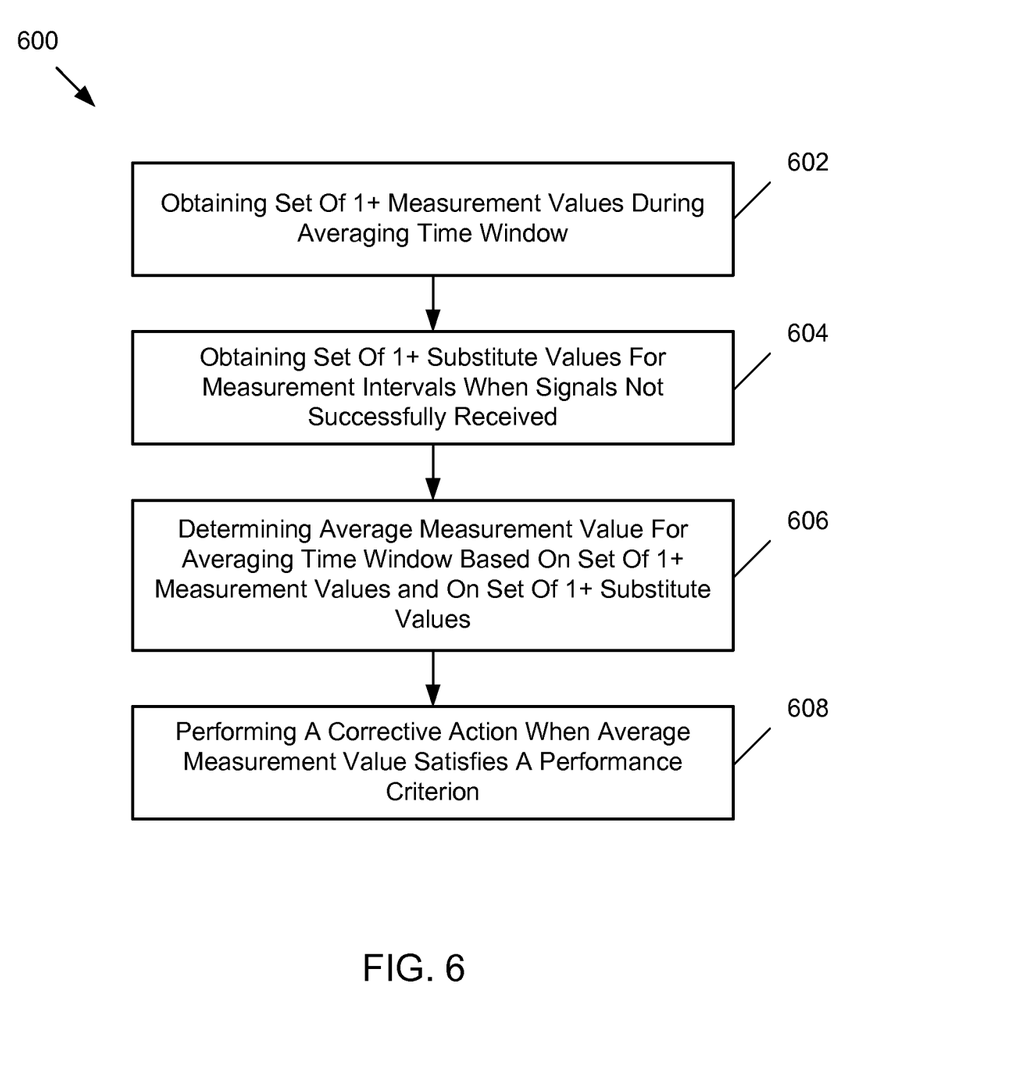
FIG. 6 illustrates a representative method for determining and using an average measurement value over an averaging time window by an electronic device.

FIG. 6 illustrates a diagram 600 of a representative method for determining and using an average measurement value over an averaging time window by an electronic device, e.g., an STA 102 or an AP 104 (or both). In some embodiments, the representative method is performed by the STA 102 in communication with the AP 104. In some embodiments, the representative method includes a step 602 of obtaining a set of one or more measurement values based on signals received by the electronic device during an averaging time window. In a representative embodiment, the STA 102 obtains a measurement value for a corresponding measurement interval based on a received signal from another electronic device, e.g., the AP 104. The received signal can include a beacon signal transmitted by the AP 104 during the measurement interval. In some embodiments, the AP 104 transmits beacon signals at regular time intervals, and the STA 102 attempts to receive and process the beacon signals to obtain the one or more measurement values during the averaging time window. The averaging time window can include multiple measurement intervals as described herein. In some instances, the STA 102 can be unable to successfully receive a signal during a measurement interval. In step 604, the STA 102 can obtain a set of one or more substitute values for one or more measurement intervals in the averaging time window when signals (e.g., beacons or other signals, packets, or data from which physical layer measurements can be obtained) are not successfully received. The STA 102 can use a measurement value from a prior measurement interval to obtain a substitute for a measurement interval in which a signal was not successfully received. The STA 102 can use a measurement value for a most recent measurement interval in which a signal was successfully received to obtain substitute values for subsequent measurement intervals in which the signal was not successfully received. In some embodiments, the STA 102 can only use a previous measurement value when the measurement interval in which the signal was not successfully received is within a predetermined number of measurement intervals (and/or within a predetermined time interval) of the measurement interval in which the signal was successfully received. In some embodiments, the STA 102 can obtain a substitute value by using a predetermined value in place of a measurement, e.g., for a measurement interval in which a signal is not successfully received and that occur at and/or beyond a number of measurement intervals (or at or exceeding a time separation) from the most recent measurement interval in which a signal was successfully received. The STA 102 can use a combination of these substitutions, e.g., using most recent measurement values for a number of measurement intervals up to a predetermined number of consecutive measurement intervals (or for up to a predetermined length of time) in which signals are not successfully received and then using a predetermined value for subsequent measurement intervals (beyond the predetermined number of consecutive measurement intervals of beyond the predetermined length of time) until a subsequent measurement interval successfully receives a signal and a measured value is obtained. In some embodiments, the STA 102 can substitute a predetermined measurement value for missing measurement values whenever a number of measurement intervals that are missing values within a continuous window equals or exceeds a predetermined threshold value. In some embodiments, the continuous window is specified by a particular number of contiguous measurement intervals. In some embodiments, the continuous window is specified by a particular length of time.

The STA 102 can subsequently determine an average measurement value for an averaging time window, in step 606, based on the set of one or more measurement values obtained in step 602 and the set of one or more substitute values obtained in step 604. In some embodiments, the STA 102 combines the measurement values and the substitute values using a filter that weights and combines the measurement values and the substitute values, e.g., an FIR or an IIR filter as described herein. In step 608, the STA 608 performs a corrective action in an instance when the average measurement value satisfies a performance criterion. In some embodiments, the STA 608 monitors the average measurement value over period of time and undertakes the corrective action when the average measurement value satisfies the performance criterion for the period of time, e.g., falling outside a range of values, falling below a threshold level, exceeding a threshold level, or another similar comparison of the average measurement value to a threshold level. In some embodiments, the predetermined value corresponds to a value for a physical layer measurement for which data packets are not decodable or for which an out of synchronization condition can occur. In some embodiments, the predetermined value corresponds to a value for which a radio link failure condition can be declared. In some embodiments, the predetermined value corresponds to a physical layer measurement value that provides an indication of the quality of a wireless connection between the STA 102 and the AP 104 (or a similar metric for a wireless connection between two wireless electronic devices.) In some embodiments, the STA 102 can perform a roaming scan as a corrective action, e.g., to locate a more suitable AP 104 and/or to change radio frequency operating parameters to improve a wireless connection to the AP 104. In some embodiments, the STA 102 can switch between different wireless interfaces as a corrective action, e.g., to form a second wireless connection or a new wireless connection to the AP 104 or to another wireless electronic device, e.g., a second AP 104. In some embodiments, physical layer measurements of received signals are performed by a wireless module of the STA 104, e.g., the Wi-Fi module 506, and measurement values are provided to a processor, e.g., the application processor 504, which determines average measurement values over averaging time windows. In some embodiments, the Wi-Fi module 506 determines the average measurement values and provides the average measurement values to the application processor 504 for further evaluation. In representative embodiments, the Wi-Fi module 506 and/or the application processor 504, alone or in combination, determine to perform one or more corrective actions based on the average measurement values.

Alternatively or additionally, although examples are provided above that include the use of Wi-Fi, the features described herein can also be used for communication/measurements in any appropriate wireless communication technology, including but not limited to one or more of: Bluetooth; GSM/EDGE, UMTS; CDMA2000; LTE; LTE-A technology. In such an instance, each or any of the actions described herein as performed by the Wi-Fi module can be performed by one or other wireless modules in a wireless device capable of communicating according to the other (e.g., Bluetooth, LTE, and so on) wireless technology, and/or can be performed by a wireless module that implements multiple (e.g., Wi-Fi technology as well as the other) wireless technologies.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium can be any data storage device that can store data which can thereafter be read by a computer system. Examples of the computer readable medium include read-only memory, random-access memory, CD-ROMs, HDDs, DVDs, magnetic tape, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for use in an electronic device, the method comprising:
   by the electric device:
   measuring a signal at a first time to obtain a first measurement value;
   when the signal is not measurable at a second time, obtaining a first substitute value using the first measurement value;
   when the signal is not measurable at a third time, obtaining a second substitute value using a predetermined value;
   forming a set of one or more measurement values, wherein the set of one or more measurement values comprises the first measurement value, and wherein the set of one or more measurement values is associated with successful reception of the signal during an averaging time window, each measurement value corresponding to a particular measurement interval in the averaging time window;
   forming a set of two or more substitute values, wherein the set of two or more substitute values comprises the first substitute value and the second substitute value, and wherein the set of two or more substitute values is associated with unsuccessful reception of the signal for two or more consecutive measurement intervals in the averaging time window;
   determining an average measurement value for the averaging time window based at least in part on the set of one or more measurement values and on the set of two or more substitute values; and
   performing a corrective action when the average measurement value satisfies a performance criterion.

2. The method of claim 1, wherein determining the average measurement value for the averaging time window comprises using a filter to combine the set of one or more measurement values and the set of two or more substitute values.

3. The method of claim 2, wherein the filter comprises a finite impulse response (FIR) filter.

4. The method of claim 2, wherein the filter comprises an infinite impulse response (IIR) filter.

5. The method of claim 1, wherein the predetermined value comprises a value corresponding to a physical layer measurement for which data packets are not decodable or for which an out of synchronization condition can occur.

6. The method of claim 1, wherein the electronic device comprises a wireless station (STA) that operates in accordance with a wireless local area networking communication protocol.

7. The method of claim 6, wherein the signal comprises a beacon transmitted at regular time intervals by an access point (AP).

8. The method of claim 6, wherein the wireless local area networking communication protocol is a Wi-Fi communication protocol.

9. The method of claim 1, wherein forming the set of two or more substitute values comprises:
   using the first measurement value for measurement intervals that occur within a predetermined number of measurement intervals of a most recent measurement interval in which a signal was successfully received, wherein the first measurement value is from the most recent measurement interval in which the signal was successfully received; and
   using the predetermined value for measurement intervals that occur beyond the predetermined number of measurement intervals of the most recent measurement interval in which the signal was successfully received.

10. The method of claim 1, wherein the average measurement value satisfies the performance criterion when the average measurement value provides an indication of a radio link failure condition for a wireless connection between the electronic device and a second electronic device.

11. The method of claim 8, wherein performing the corrective action comprises one or more of: performing a roaming scan or switching between different wireless interfaces of the electronic device.

12. An electronic device comprising processing circuitry configured to cause the electronic device to at least:
   measure a signal at a first time to obtain a first measurement value;
   when the signal is not measurable at a second time, obtain a first substitute value using the first measurement value;
   when the signal is not measurable at a third time, obtain a second substitute value using a predetermined value;
   form a set of one or more measurement values, wherein the set of one or more measurement values comprises the first measurement value, and wherein the set of one or more measurement values is associated with successful reception of the signal during an averaging time window, each measurement value in the set of measurement values corresponding to a particular measurement interval in the averaging time window;
   form a set of two or more substitute values, wherein the set of two or more substitute values comprises the first substitute value and the second substitute value, and wherein the set of two or more substitute values is associated with unsuccessful reception of the signal for two or more consecutive measurement intervals in the averaging time window;
   determine an average measurement value for the averaging time window based at least in part on the set of one or more measurement values and on the set of two or more substitute values; and
   perform a corrective action when the average measurement value satisfies a performance criterion.

13. The electronic device of claim 12, wherein the processing circuitry comprises at least a wireless module and an application processor.

14. The electronic device of claim 12, wherein the electronic device comprises a wireless station (STA) that operates in accordance with a Wi-Fi wireless communication protocol, and wherein the signals comprise beacons received from a wireless access point (AP).

15. The electronic device of claim 12, wherein the processing circuitry is configured to cause the electronic device to determine the average measurement value for the averaging time window by using a finite impulse response (FIR) filter or an infinite impulse response (IIR) filter.

16. The electronic device of claim 12, wherein the processing circuitry is configured to cause the electronic device to form the set of two or more substitute values by:
   using the first measurement value for measurement intervals that occur within a predetermined number of measurement intervals of a most recent measurement interval in which a signal was successfully received, wherein the first measurement value is from the most recent measurement interval in which the signal was successfully received; and
   using predetermined value for measurement intervals that occur beyond the predetermined number of measurement intervals of the most recent measurement interval in which the signal was successfully received.

17. A non-transitory computer readable medium having computer program code stored thereon, the computer program code, when executed by one or more processors on an electronic device, causes the electronic device to perform a method comprising:
   receiving, from a second electronic device, a signal at a first time, a second time, and a third time over a wireless connection;
   measuring the signal at the first time to obtain a first measurement value;
   when the signal is not measurable at the second time, obtaining a first substitute value using the first measurement value;
   when the signal is not measurable at the third time, obtaining a second substitute value using a predetermined value;
   forming a set of one or more measurement values, wherein the set of one or more measurement values comprises the first measurement value, and wherein the set of one or more measurement values is associated with successful reception of the signal during an averaging time window, each measurement value corresponding to a particular measurement interval in the averaging time window;
   forming a set of two or more substitute values, wherein the set of two or more substitute values comprises the first substitute value and the second substitute value, and wherein the set of two or more substitute values is associated with unsuccessful reception of the signal for two or more consecutive measurement intervals in the averaging time window;
   determining an average measurement value for the averaging time window based on the set of one or more measurement values and on the set of two or more substitute values; and
   performing a corrective action when the average measurement value satisfies a performance criterion.

18. The method of claim 1, wherein a difference between the first time and the second time is 100 milliseconds and a duration of the averaging time window is 0.8 seconds.

19. The method of claim 17, wherein the corrective action comprises:
   initiating a roaming scan,
   switching to a different wireless interface,
   declaring a radio link failure, or
   changing a radio frequency operating parameter to improve the wireless connection with the second electronic device.

* * * * *